United States Patent
Chapin

[15] 3,642,525
[45] Feb. 15, 1972

[54] FIRE-RESISTANT FIBERS AND FABRIC

[72] Inventor: Jay C. Chapin, Chicago, Ill.

[73] Assignee: Ventron Instruments Corp., Scientific Chemicals Division

[22] Filed: Aug. 8, 1968

[21] Appl. No.: 751,053

[52] U.S. Cl. ............... 117/136, 117/138.8 F, 117/138.8 D, 117/138.8 N, 117/138.8 U, 117/141
[51] Int. Cl. ........................................ B32b 27/08, C09d 5/18
[58] Field of Search.................... 117/136, 138.8 N, 138.8 F, 117/141, 138.8 D, 138.8 U; 260/31.8 N, 552; 106/15 FP; 252/8.1

[56] References Cited

UNITED STATES PATENTS

| 3,142,695 | 7/1964 | Rolih et al. | 106/15 X |
| 3,201,417 | 8/1965 | Weil | 106/15 UX |
| 3,310,420 | 3/1967 | Wagner | 117/136 X |
| 3,418,263 | 12/1968 | Hindersinn et al. | 106/15 X |
| 3,418,362 | 12/1968 | Goonewardene et al. | 260/552 X |
| 3,440,196 | 4/1969 | Boldebuck et al. | 117/161 X |
| 3,470,094 | 9/1969 | Zimmermann et al. | 252/8.1 |

FOREIGN PATENTS OR APPLICATIONS

| 558,011 | 12/1943 | Great Britain | 117/161 |

Primary Examiner—William D. Martin
Assistant Examiner—Harry J. Gwinnell
Attorney—Dressler, Goldsmith, Clement & Gordon

[57] ABSTRACT

Fibers, such as natural fibers wool and silk and synthetic fibers, for example, polyesters, such as dacron, and polyamides such as nylon are coated with a reaction product of polyhalogenated acids having a cyclic nucleus such as chlorendic acid with thiourea to render the fibers fire-resistant and self-extinguishing after removal of the initiating flame.

4 Claims, No Drawings

FIRE-RESISTANT FIBERS AND FABRIC

This invention relates to improving the resistance to burning and flame propagation of synthetic polymeric materials, and natural fibers such as wool and silk. More particularly, it relates to the coating of objects and filaments with a film which imparts resistance to burning and flame propogation. Still more particularly, it relates to a method of imparting the property of fire resistance to fabrics by means of a coating composition, one component of which is produced, for example, by the reaction of chlorendic acid with thiourea.

Briefly, the present invention comprises reacting a polyhalogen substituted dicarboxylic acid compound having a cyclic nucleus with a thio-substituted amide to produce reaction products which can be deposited in liquid form on filamentous structures and dried to a coating for individual fibers resulting in composites which have fire-retardant properties and are self-extinguishing after removal of the initiating flame.

Synthetic resins, for example, polyurethanes such as the reaction products of a polyol and toluene diisocyanate, polyesters such as the reaction products of polyols and polycarboxylic acids, polyamides such as the reaction products of aliphatic diamines and polycarboxylic acids, known as nylons, may be cured to form resins that are hard and durable and may be formed into filaments for such uses as weaving into fabrics.

These synthetic resins and fibers fail to have all the properties desired for certain applications and efforts have been made to modify the resins such as reacting components to incorporate phosphorus containing materials therein and thereby improve the flame resistance, etc. Such efforts to modify the resins have met with limited success as they resulted in side effects such as reduction in the necessary cross-linking changes in gelation, etc., which were detrimental to the resin filaments.

Now it has been discovered that conventional resins of the types discussed above, can be treated to develop or retain desired or optimum properties of the synthetics, such as strength, and subsequently, the property of resistance to burning may be provided without deleterious effect on other properties by adhering thereto a coating that is the reaction product of a polyhalogenated polycarboxylic acid with thio-substituted diamides which reaction products can be dried or cured to a surface layer which can be matched to the flexibility characteristics of the synthetic resin. After drying, the coating resists removal by dry cleaning and laundering chemicals and imparts resistance to burning and flame propogation.

In accordance with the invention, a polyhalogenated dicarboxylic acid compound having a norbornene cyclic nucleus is reacted with a weakly basic thio-substituted amide. Apparently, the reaction is one ultimately between amine groups and carboxyl groups. The reaction forms an amorphous reaction product when terminated at the point of production of a clear liquid reaction product.

For present purposes, halogenated compound is intended to mean various compounds with two carboxylic acid groups in ortho position to each other or the anhydrides thereof. Typical polyhalogenated norbornene dicarboxyl compounds are chlorendic acid, (1,4,5,6,7,7-hexachlorobicyclo-(2.2.1)-5-heptene-2,3-dicarboxylic acid), chlorendic anhydride, 1,4,5,6,7,7-hexabromobicyclo-(2.2.1)-5-heptene-2,3-dicarboxylic acid, 1,4–5,6,7,7-hexachloro-2-methylbicyclo-(2.2.1)-5-heptene-2,3-dicarboxylic acid, 1,4,5,6-tetrachloro-7,7-difluorobicyclo-(2.2.1)-5-heptene-2,3-dicarboxylic acid, 1,4,5,6,7,7-hexachlorobicyclo-(2.2.1-5-heptene-2-acetic-3-carboxylic acid, and the like. Typical thio-substituted amides are thiourea, 2-imidazolidinethione (ethylene thiourea), thio-substituted diamides such as those having an alkyl radical of up to three carbon atoms and having a sulfur substituent attached to one or more of the carbon atoms of the alkyl radical.

In reacting a polycarboxyl compound and a polyamide, the mixture of powdered solids with or without wetting with water is heated to a temperature in the range between about 125° C. and 175° C., preferably to between 145° C. and 155° C. Upon melting, gaseous products are evolved. When gas evolution subsidies, a clear solution is obtained which has a light color of the straw or tan type and the reaction should be terminated at this point by withdrawal of heat, i.e., quenching to a temperature below 135° C. Continued heating at temperatures in the above specified range or allowing the exothermic reaction to continue, for example, to elevate the temperature of the heating mixture to 185° C., results in conversion of the amorphous reaction product to a crystalline material which can only, with difficulty, be converted to a flexible coating.

Upon cooling of the clear molten reaction mixture, a hard and brittle resin is obtained which is amorphous and noncrystalline in character. The amorphous products of reaction of equimolar quantities of reactants generally has a softening point in the range between 55° C. (131° F.) and 65° C. (149° F.). The amorphous product of reaction of 1 mole of norbornene polycarboxyl compound with 2 moles of diamide generally has a softening point in the range between 95° C. (203° F.) and 110° C. (230° F.). These reaction products are soluble in alcohols and ketones. The reaction product of reacting equimolar amounts of chlorendic anhydride and thiourea is shown by Nuclear Magnetic Resonance Analysis to contain at least 50 percent of a reaction product having one free carboxyl group. The reaction product of reacting 2 moles of thiourea with 1 mole of chlorendic anhydride is shown by Nuclear Magnetic Resonance Analysis to be predominantly a reaction product in which both carboxyl groups have been converted to acid amides.

The reaction may be effected between substantially stoichiometric amounts of reactants. The amount of polyhalogenated polycarboxyl compound should be present in amounts constituting a molecular ratio of carboxyl compound to diamide in the range between 1:0.5 and 1:3 and preferably, about 1:2. If the carboxyl compound is an anhydride, then at least the stoichiometric equivalent amount of water may be used to effect complete conversion of the anhydride to a dicarboxylic acid. Excess water is not needed and is at least partially distilled off before the reactants are converted to the molten mixture of components and reaction products. Unreacted components may be removed by an after treatment.

The reaction of polyhalogenated carboxyl compound and thio-substituted diamide in accordance with the invention, can be performed at various pressures, atmospheric and subatmospheric pressures, and the temperatures of reaction can vary from 125° C. (257° F.) to 175° C. (347°F.) with the range preferable for reaction of chlorendic anhydride being between about 145° C. (293° F.) and 155° C. (311° F.). Low temperatures within the above range are advantageous because the reaction is accompanied by evolution of gas which is violent enough to introduce problems in control of contents of the reaction vessel and further, the reaction products remain lighter in color.

The reaction is preferably effected after thoroughly agitating and mixing the powdered ingredients, water-wetted or not. The agitation prevents local overheating and after the reactants are intimately mixed, the temperature may be raised to the desired reaction temperature and held at this temperature until the reaction has been completed.

The hard, brittle character of this amorphous reaction product limits its utility in an unmodified form to a coating material for objects of great rigidity. Where it is desired to impart a fire-retardant coating to filamentous material, synthetic resin fabrics, and the like, which are highly flexible, a plasticizer containing composition is required. This reaction product can be plasticized when in the form of quenched fluid in the reaction kettle or by mixing reaction products with liquid plasticizers.

The invention is illustrated by the following examples which are given by way of illustration and without any intention that the invention be limited thereto.

EXAMPLE I

To 371 grams (1 mole) of chlorendic anhydride (1,4,5,6,7,7-hexachloro-5-norbornene 2,-3 dicarboxylic anhydride) is added 76 grams (1 mole) of thiourea and 18 grams of water (1 mole). The mixture of water-wetted powders is stirred until the added water is more or less evenly distributed through the mass. The mixture is then placed in an oil bath and heated to a temperature of approximately 160° C. (320° F.). The mixture is continuously stirred while in the oil bath and allowed to melt. After total solution is reached, the stirring is continued until production of gas has subsided as determined by complete clarity of the solution which should be straw colored to light tan at this point. The solution is allowed to harden. At room temperature a hard and brittle resin is formed. The reaction product which is predominantly 1,4,5,6,7,7-hexachloro-3- (3-thio allophanoyl)-5-norborene-2-carboxylic acid has a softening point of 61° C. (141.8° F.). Weight loss from the above procedure is about 25 grams. The reaction product is soluble in alcohols and acetone.

EXAMPLE II

Eighty-five parts by weight of chlorendic anhydride, 35 parts by weight of thiourea and 5 by weight of water were stirred and mixed to obtain a uniform granular mixture.

The granular mixture was heated slowly with continuous agitation to bring the mixture to a temperature of 158° C. (316.4° F.) in approximately 30 minutes. To the molten mass was added 60 parts by weight of polychlorinated polyphenyl (Arochlor 1254) which was preheated to approximately 127° C. (260° F.). The reaction product is predominantly 1,4,5,6,7,7-hexachloro-N,N'-bis(thiocarbamoyl)-5-norbornene-2,3-dicarboxamide.

An aqueous solution was separately prepared by dissolving 6 parts by weight gum ghatti, and 4 parts by weight of isoctyl phenyl polyethoxy ethanol (Triton X-100) in 212 parts by weight of water and heating the admixture to approximately 40° C. (120° F.).

The aqueous solution was added to the molten mass while maintaining strong agitation, in small quantities until the reaction was quenched and the temperature of the resultant mixture is lower than the boiling point of water. The balance of the aqueous solution was then added without regard to flow rate and the admixture stirred while allowing it to cool to about 49° C. (120° F.). The admixture was then homogenized by passage through a Cherry-Burrell Homogenizer operating at 2,000 pounds p.s.i. to improve the emulsion stability.

It will be appreciated that the hard brittle character of this reaction product will detract from its value as a coating for fabrics. The reaction product may be converted to an amorphous flexible material by incorporation of a compatible plasticizer in appropriate quantities. Plasticizers may be added to the mixture of reactants, i.e., prior to reaction or to the reaction products.

A compatible plasticizer may be prepared from chlorendic anhydride itself, as follows:

To 2,620 grams of chlorendic anhydride is added 1,200 grams of n-butanol, a molar ratio of chlorendic anhydride to n-butanol of 1:2.3. Two grams of 5 percent calcium octoate is added as catalyst. The mixture is heated under a carbon dioxide blanket to 130° C. whereupon complete solution is observed. The temperature of the solution may be increased to 149° C. in 5 hours. Heating and refluxing is continued for 12 hours. The excess n-butanol is distilled off under vacuum at a temperature of 120° C. (248° F.). The reaction product is an oily liquid, the acid value of the ester being 17.4.

Other useful plasticizers are diethyl- and dipropyl-esters of chlorendic acid, sulfur-chlorinated esters of chlorendic acid, chlorinated paraffins such as Arochlor 1254, preferably containing halogen, sulfur and phosphorus. For purposes of this invention, the plasticizer should not appreciably reduce the fire retardant properties of the reaction products.

In order to render the reaction product of example I useful for coating woven fabrics, a coating composition is prepared in which the plasticizer generally constitutes between 40 percent and 60 percent by weight of the composition. A combination comprising 60 parts by weight of the resinous reaction product and 40 parts by weight of the plasticizer of example II, when applied to give a 10 percent dry add-on in weight provides a satisfactory fireproofing coating on nylon webbing.

In order to function as a fire retardant, the resinous reaction product of this invention must be present as a uniformly distributed coating generally constituting a dry add-on in the range between about 8 percent and 15 percent by weight said percentage being based upon the original dry weight of said base, i.e., filament or woven fabric base, the amount depending upon the thickness and construction of the fabric.

One of the problems is that synthetic resin fabrics such as nylon, acrylic fiber, etc., generally have a low affinity for add-on solutions. For this reason, whether the carrier is water and/or organic solvents such as alcohols, ketones, and the like, the treating solutions must be concentrated to obtain the proper add-on of coating material.

To insure a proper add-on or pickup of coating solutions, solutions are generally prepared containing 20 to 45 percent by weight of the chlorendic acid thiourea reaction product or reaction product plus the plasticizer. A typical ethanol solution for treating woven nylon will contain 30 percent solids by weight by 12 percent being plasticizer and the 18 percent remainder being chlorendic acid reaction product.

Fire-retardant coatings may also be deposited from aqueous emulsion treating compositions. A typical emulsion comprised 21.8 parts of dibutylester of chlorendic acid, 18.2 parts of chlorendic acid thiourea resinous reaction product, 1 part of dispersing agent, 1.5 protective colloidal stabilizer for emulsions and 57.5 parts of water.

To prepare such an emulsion, the molten resinous reaction product is added to the dibutylester of chlorendic acid maintained at about 80° C. (176° F.). The solution is then added to the water solution of dispersants and the whole mechanically agitated to distribute the dibutylester and resinous reaction product as the dispersed phase of an oil-in-water emulsion. The finished emulsion has a pH between 3 and 4.

After passing the synthetic resin woven fabric through a solution or emulsion or padding the fire-retardant composition onto the fabric, the fabric is dried with or without afterwashing, preferably at a temperature in the range between about 100° C. (212° F.) and 150° C. (318° F.).

A nylon fabric was fireproofed as follows:

EXAMPLE III

Nylon webbing was passed through an aqueous emulsion containing 40 percent by weight of plasticizer and resin, consisting of 16 parts by weight of dibutylester of chlorendic acid and 24 parts of chlorendic acid thiourea resinous reaction product dispersed in a gum ghatti-Triton X-100 solution as discussed previously. The nylon fabric, after drying, was found to have a dry add-on adhered to the fibers, constituting an 8 percent increase in dry weight.

This coated nylon webbing was tested for flame resistance by the 1951 Federal Specifications Method No. 5902, CC-T-191B.

This nylon webbing was self-extinguishing in 2.8 seconds after 12 second exposure to a Bunsen gas burner flame. The untreated control sample of nylon webbing was completely consumed after removal of the initiating flame. The treated nylon webbing exhibited reduced dripping of the burning nylon.

The above-described coating shown to be effective as a fire retardant for nylon is ineffective for the treatment of cotton. Modifications of these reaction products, however, are useful for the treatment of cotton and cotton fabrics.

The above-detailed description of this invention has been given by way of illustration without any intention that the invention be limited to the exact conditions set forth. No unnecessary limitations should be understood therefrom as modifications will be obvious to those skilled in the art.

I claim:

1. A fire-resistant woven fabric comprising woven synthetic resin filaments having a surface coating which constitutes an add-on by weight of between 8 percent and 15 percent based upon the original dry weight of said woven filaments and consists of between 40 percent and 60 percent by weight of the product of reaction of thio-substituted diamide having an alkyl radical of up to 3 carbon atoms with a polyhalogenated norbornene polycarboxylic acid having the carboxyl groups in ortho position to each other, in a molar ratio in the range between 0.5:1 and 3:1, and between 60 percent and 40 percent by weight of a plasticizer which does not appreciably reduce the fire retardant properties of said product of reaction.

2. A fire-resistant woven fabric according to claim 1 wherein the plasticizer is dibutylester chlorendic acid and the product of reaction is that produced by reacting chlorendic acid and thiourea.

3. A flexible fire-resistant fiber comprising a filament selected from the group consisting of silk, wool and synthetic polymeric material having a surface coating which constitutes an add-on by weight of between 8 percent and 15 percent and consists of between 40 percent and 60 percent by weight of the product of reaction of thio-substituted diamide having an alkyl radical of up to 3 carbon atoms with a polyhalogenated norbornene polycarboxylic acid having the carboxyl groups in ortho position to each other, in a molar ratio in the range between 0.5:1 and 3:1, and between 60 percent and 40 percent by weight of a plasticizer which does not appreciably reduce the fire-retardant properties of said product of reaction.

4. A flexible fire-resistant fiber according to claim 3 wherein the plasticizer is dibutyl ester of chlorendic acid and the product of reaction is that produced by reacting chlorendic acid and thiourea.

* * * * *